United States Patent
Ostan et al.

(10) Patent No.: US 7,398,798 B2
(45) Date of Patent: Jul. 15, 2008

(54) FLEXIBLE SLEEVE LINER FOR A CONVOLUTE DUCT

(75) Inventors: Terry W. Ostan, Whitby (CA); Jin Huang, Toronto (CA); Lei Li, Whitby (CA)

(73) Assignee: GM Global Technology Operations, Inc., Detroit, MI (US)

( * ) Notice: Subject to any disclaimer, the term of this patent is extended or adjusted under 35 U.S.C. 154(b) by 48 days.

(21) Appl. No.: 11/425,734

(22) Filed: Jun. 22, 2006

(65) Prior Publication Data
US 2007/0295422 A1    Dec. 27, 2007

(51) Int. Cl.
*F16L 11/00* (2006.01)
(52) U.S. Cl. .................. 138/121; 138/118; 138/114; 285/226; 285/300
(58) Field of Classification Search .......... 138/118, 138/121, 114, 120, 122; 118/212, 227, 228, 118/247; 285/226, 300, 45, 55
See application file for complete search history.

(56) References Cited

U.S. PATENT DOCUMENTS

| 2,898,941 | A | * | 8/1959 | Kilcup | 138/121 |
|---|---|---|---|---|---|
| 2,934,095 | A | * | 4/1960 | Lockhart | 138/121 |
| 3,330,303 | A | * | 7/1967 | Fochler | 138/120 |
| 3,549,176 | A | * | 12/1970 | Contreras | 285/55 |
| 3,837,685 | A | * | 9/1974 | Miller | 285/45 |
| 5,058,934 | A | * | 10/1991 | Brannon | 285/226 |
| 5,727,599 | A | * | 3/1998 | Fisher et al. | 138/156 |
| 5,829,483 | A | * | 11/1998 | Tukahara et al. | 138/109 |
| 5,901,754 | A | * | 5/1999 | Elsasser et al. | 138/118 |
| 6,062,268 | A | * | 5/2000 | Elsasser et al. | 138/121 |
| 6,186,182 | B1 | * | 2/2001 | Yoon | 138/122 |
| 6,240,964 | B1 | * | 6/2001 | Cooper et al. | 138/30 |
| 6,324,837 | B1 | * | 12/2001 | Jenne et al. | 60/322 |
| 6,607,010 | B1 | * | 8/2003 | Kashy | 138/121 |
| 7,089,965 | B2 | * | 8/2006 | Cheng et al. | 138/121 |
| 2006/0081302 | A1 | * | 4/2006 | Taira et al. | 138/118 |

* cited by examiner

*Primary Examiner*—Patrick F Brinson

(57) ABSTRACT

An air induction system wherein the outlet air assembly includes a sleeve-lined convolute duct. A sleeve liner is disposed within a convolute duct which spans the convolutes, wherein an attached end of the sleeve liner is attached to a non-convolute portion of the convolute duct, wherein a free end is freely slidable in the convolute duct, and wherein the free end of the sleeve liner and the attached end of the sleeve liner each serve as a sealing cuff whereby air flow is laminar therethrough irrespective of the convolutes.

17 Claims, 4 Drawing Sheets

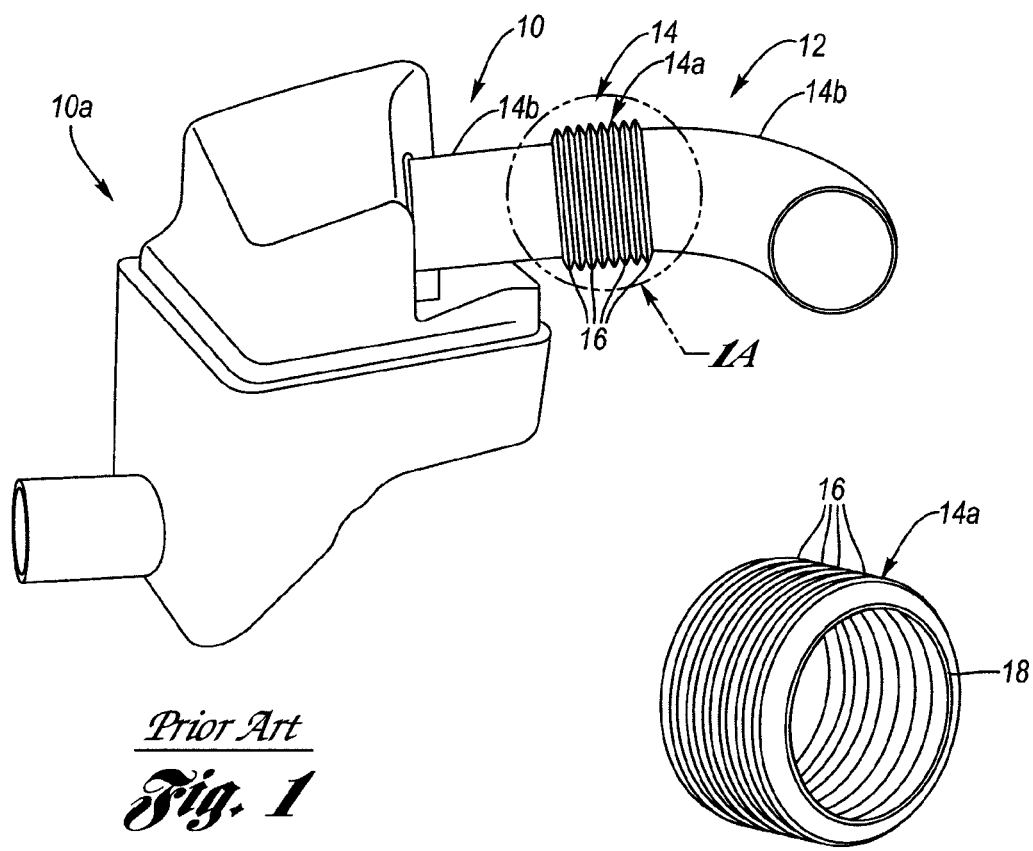
*Prior Art*
*Fig. 1*
*Prior Art*
*Fig. 1A*
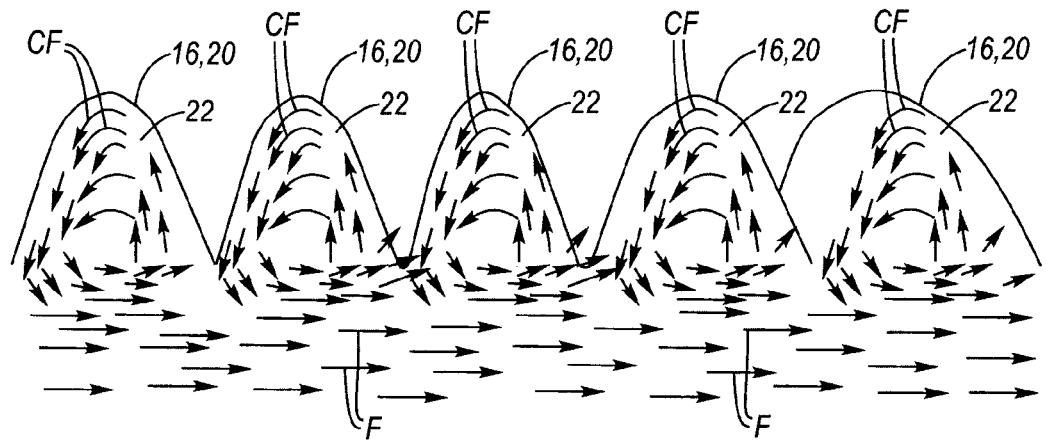
*Prior Art*
*Fig. 1B*

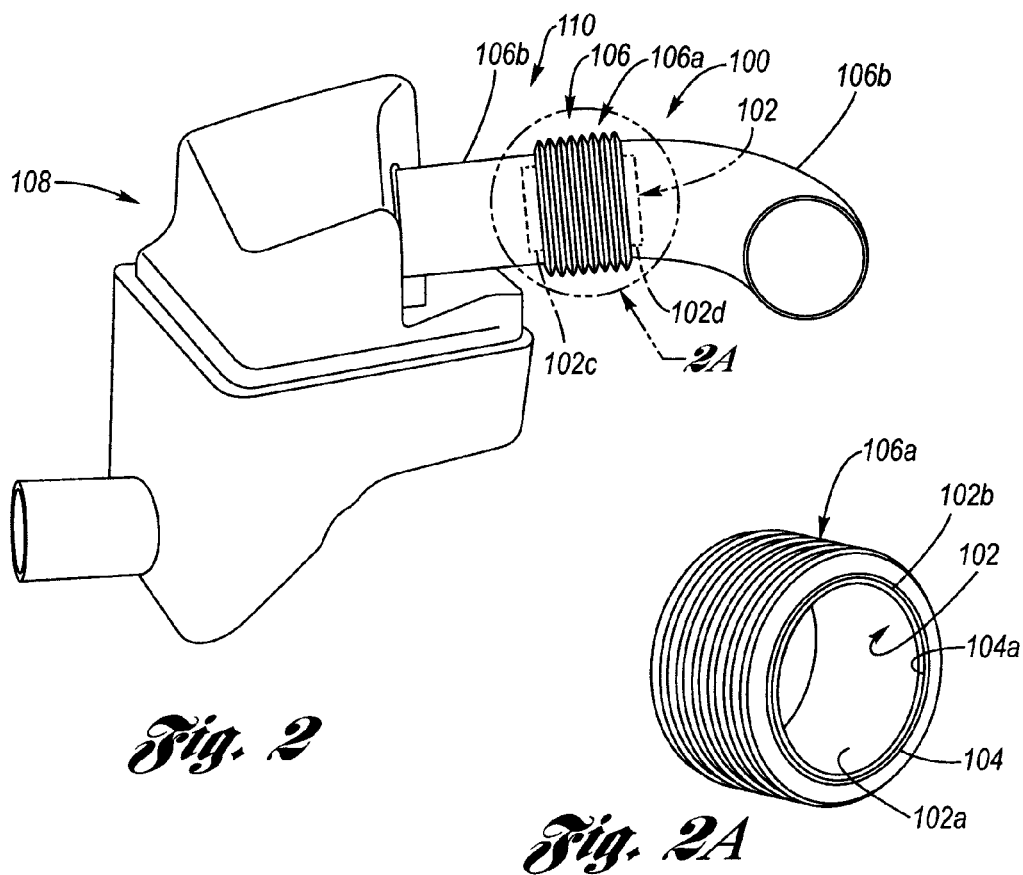
Fig. 2
Fig. 2A
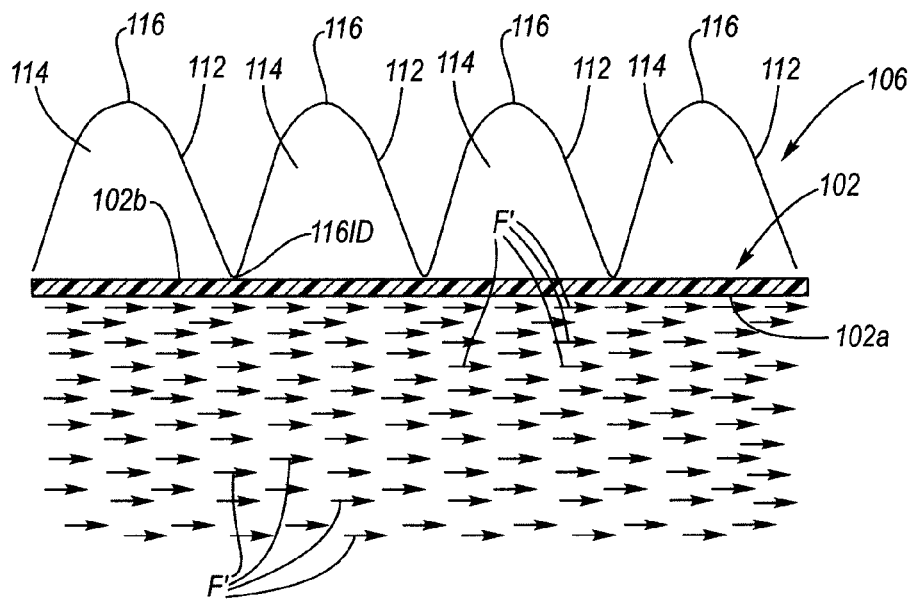
Fig. 3

FLEXIBLE SLEEVE LINER FOR A CONVOLUTE DUCT

TECHNICAL FIELD

The present invention relates to convolute ducts, particularly those used for automotive air induction systems. More particularly, the present invention relates to a flexible sleeve liner for smoothly lining an interior radius of a convolute duct.

BACKGROUND OF THE INVENTION

The air induction system (AIS) of an internal combustion engine of a motor vehicle, see generally 10 in FIG. 1, is a complex and finely-tuned system, balancing requirements and constraints that are often in tension with one another.

Conventionally, an air cleaner with a mass air flow sensor package 10a is connected to the engine intake manifold (not shown) by an air cleaner outlet duct assembly 12 which includes a convolute duct 14. Convolute air ducts of various lengths and sizes are used to transfer clean, filtered and metered air from an air filter to the engine air intake manifold. Oftentimes, these convolute ducts are of a complicated serpentine configuration due to limited space within the motor vehicle engine compartment.

The outlet duct assembly must fulfill the following main functions: provide a smooth airflow with minimum flow restriction (pressure loss); absorb engine motions under engine torque roll in all operating conditions; isolate engine vibrations from transmitting to the body structure; resist collapse under vacuum; maintain sealing at all system connections; and provide duct flexibility to ease efforts of the air filter service.

It is a challenge to keep a proper balance as between all of these needs because many of the requirements are conflicting. For example, to accommodate engine movement, the outlet duct assembly 12 must have flexibility, the flexibility being provided by convolutes 16 in the sidewall 18 of an air duct to thereby provide a convolute duct 14 having a convolute portion 14a and non-convolute portions 14b on either side thereof.

Convolute ducts are generally formed using an injection or blow molding process. The convolute duct is normally made from soft materials, such as a thermoplastic elastomer (TPE), or rubber. The flexibility depends on the parameters of convolute duct like material hardness, wall thickness, radius, and length. The convolutes 16 of the convolute duct 14 are characterized by a plurality of raised circumferential ridges 20 (see FIG. 1B) which allow compression, extension, deflection and distortion of the convolute duct sidewall 18. Thereby, a convolute duct performs as a decoupling agency for assembly, engine movements, shock absorption and noise, vibration and harshness (NVH) control.

Though convolute ducts 14 are effective in absorbing engine motions and isolating vibrations, a problem with convolute ducts is that the internal circumferential ridges 20 of the convolutes 16 have large surface roughness, and each provide a cavity 22 adversely affecting local air flow. The surface of the ridges 20 and the cavities 22 create flow resistance and turbulent counterflow air CF which opposes the air flow F, thus increasing pressure loss through the convolute duct 14. This frictional resistance is known in the art as the "friction pressure loss". In particular, highly convolute ducts with compound angles can further restrict air flow, due to large flow turbulence.

The amount of friction pressure loss across a convolute duct is based in part upon the fluid characteristics, such as the fluid's density, the fluid's viscosity and the fluid's flowing rate. However, most importantly, the surface roughness of the convolute duct sidewall has the biggest effect on the friction pressure loss.

Since the convolutes have internal circumferential ridges, with large surface roughness, when airflow passes through the convolute duct, airflow is strongly affected by this surface roughness. Surface roughness is a defining feature of many of the high Reynolds-number fluid flows known in fluid dynamics engineering. In fact, the higher the Reynolds number (Re), the more likely the effects of roughness will be significant. The friction factor of a rough wall can be calculated by the formula:

$$\frac{1}{f^{1/2}} \approx -1.8\log\left[\frac{6.9}{Re} + \left(\frac{\varepsilon}{\frac{d}{3.7}}\right)^{1.11}\right] \quad (1)$$

where f is the friction factor of the rough wall, Re represents the Reynolds number, $\varepsilon$ represents the wall roughness height (e.g., convolute height in this case), and d represents the duct diameter. Equation 1 shows that the higher convolutes height $\varepsilon$, the larger is the wall roughness friction.

For the flow in a circular duct, the head pressure loss can be expressed as:

$$h_f = f \frac{L}{d} \frac{V^2}{2g} \quad (2)$$

where L is the duct length and V is the average velocity of airflow in the duct.

The pressure loss for a horizontal duct is:

$$\Delta p = \rho g h_f \quad (3)$$

Combining Equations 2 and 3, the pressure loss due to the wall-roughness friction can be derived:

$$\Delta p = f \frac{\rho L V^2}{2d} \quad (4)$$

From Equation 4, it is indicated that the pressure loss is directly proportional to the wall-roughness friction factor f. Therefore, in order to reduce the pressure drop, it is critical to minimize the wall-roughness friction factor. From Equation 1, reducing convolute height would decrease the wall friction, but this would conflict with the duct flexibility requirement. In order to absorb engine roll motions and decouple engine vibrations from vehicle body structure, the convolute duct must have sufficient flexibility with a minimal 12 mm convolute height. This size of convolute height will result in large friction factor according to Equation 1. For example, for a 150 mm long convolute duct with an 80 mm diameter and a 12 mm convolute height, the friction factor is 0.089 at 200 g/s flow rate. The wall roughness friction can result in 0.1 KPa friction pressure loss, based on the calculations per Equations 1, 2, 3 and 4.

It is well known that the more air flow that can be delivered to the engine, the engine will be able to generate more power. The pressure loss across the convolutes of a convolute duct means less air is pushed into engine. Consequently, engine power output is reduced as a result of pressure loss caused by a convolute duct.

An alternative to reducing pressure loss in a convolute duct is to decrease the convolute quantity and shorten the convolute duct. Although less convolutes will be able to reduce the air friction resistance, it still has inherent problems. First, less convolutes will lessen the ability of the duct to absorb engine vibrations. Engine vibrations can be easily transmitted to the body structure. Consequently, the excessive vibrations from the engine could cause discomfort to drivers and passengers. Secondly, each convolute has to take more engine positional displacements due to less convolutes. As a result, the durability of a short convoluted duct is always a significant concern. Finally, a short convolute duct needs more assembly effort in the vehicle assembly plant. Commonly, this type of duct can cause human ergonomic issues, thus increasing the assembly cost and time.

Another approach is to design the convolute duct with a large inner diameter. Although lowering the pressure loss within the convolute duct, the large diameter convolute duct has several limitations. As a general rule, a convolute duct must keep a 25 mm clearance to other components within an engine compartment, known in the art as "dynamic clearance" which ensures there is no hard contact between the convolute duct and surrounding components under engine torque roll conditions. Therefore, the size and routing of the convolute duct are restrained in the tight engine compartment of today's motor vehicles. Furthermore, the engine throttle body and mass air flow sensor have relatively small diameters due to their standard design dimensions. If the convolute duct diameter is too large relative these components, the air flow can experience sudden expansion at the exit of the mass air flow sensor and a sudden contraction at the entry of the engine throttle body. This sudden expansion and contraction of the air flow can cause significant pressure loss.

Accordingly, what remains needed in the art is an air induction system for an internal combustion engine of a motor vehicle in which the outlet air assembly includes a convolute duct which avoids its inherent frictional pressure losses.

SUMMARY OF THE INVENTION

The present invention is an air induction system for an internal combustion engine of a motor vehicle in which the outlet air assembly includes a sleeved convolute duct whereby the convolute duct performs its essential NVH control, yet avoids the inherent frictional pressure losses associated with conventional convolute ducts.

The present invention provides a sleeve liner at the inner side of the sidewall of a convolute duct. The sleeve liner provides a laminar air flow therethrough, whereby the air flow avoids any interaction with the ridges and cavities of the convulations, yet further provides duct flexibility. The sleeve liner has a smooth, continuously even inner surface from one end to the other (by "smooth, continuously even inner surface" is meant the inner surface is without convolutes, breaks or other irregularities) providing consistent airflow with little pressure loss, and at the same time, the sleeve liner is adequately flexible to maintain the ability of the convolute duct to flex in response to engine motion, such as compression, extension, twist, off-alignment, etc.

The sleeve liner is made from a preferably soft (i.e., flexible) material, or from a semi-rigid, or rigid material, like rubber, a thermoplastic elastomer (TPE), plastic, polypropelene, etc. The sleeve liner is configured as a tube by using, for example, an injection molding process, blow molding, extrusion molding or any other suitable process. The sleeve liner is disposed coaxial, and at least coterminal, with respect to the convolute portion of the convolute duct, wherein the outer surface of the sleeve liner abuts the non-convolute portion of the convolute duct, and is adjacent the innermost diameter of the convolutes. The sleeve liner is permanently disposed inside of the convolute duct by attachment at one end of the sleeve liner to the convolute duct, whereby the opposite free end of the sleeve liner is freely slidable inside the convolute duct in response to movements of the convolute duct.

The sleeve liner provides a convolute duct with a smooth, continuously even internal surface from one end to the other, preferably being of a constant inner diameter, whereby the sleeve liner effectively reduces the pressure loss which would be otherwise caused by convolute wall friction and at the same time minimizes air flow separation, turbulence and swirl. Furthermore, because the sleeve liner has a free end which freely slides in relation to the convolute duct as the convolute duct moves, it can maintain the ability of the convolute to readily flex and twist in response to engine motion and vibration.

Accordingly, it is an object of the present invention to provide an air induction system for an internal combustion engine of a motor vehicle in which the outlet air assembly includes a sleeved convolute duct, whereby the convolute duct performs its essential NVH control, yet avoids the inherent frictional pressure losses associated with conventional convolute ducts.

This and additional objects, features and advantages of the present invention will become clearer from the following specification of a preferred embodiment.

BRIEF DESCRIPTION OF THE DRAWINGS

FIG. 1 is a perspective view of a prior art air induction system for an internal combustion engine of a motor vehicle.

FIG. 1A is a perspective, detail view of a convolute portion of a convolute duct of the prior art air induction system, as seen at circle 1A of FIG. 1.

FIG. 1B is a schematic representation of a computer generated air flow pattern in the vicinity of the convolutes of a convolute duct similar to that shown at FIG. 1A when an air induction system similar to that shown at FIG. 1 is in operation.

FIG. 2 is a perspective view of an air induction system according to the present invention for an internal combustion engine of a motor vehicle.

FIG. 2A is a perspective, detail view of a convolute portion of a convolute duct having a sleeve liner operatively installed according to the present invention of the air induction system as seen at circle 2A of FIG. 2.

FIG. 3 is a schematic representation of a computer generated air flow pattern in the vicinity of the inside diameter of the sleeve liner disposed at convolutes of a convolute duct similar to that shown at FIG. 2A when an air induction system similar to that shown at FIG. 2 is in operation.

DESCRIPTION OF THE PREFERRED EMBODIMENT

Figure 4A:
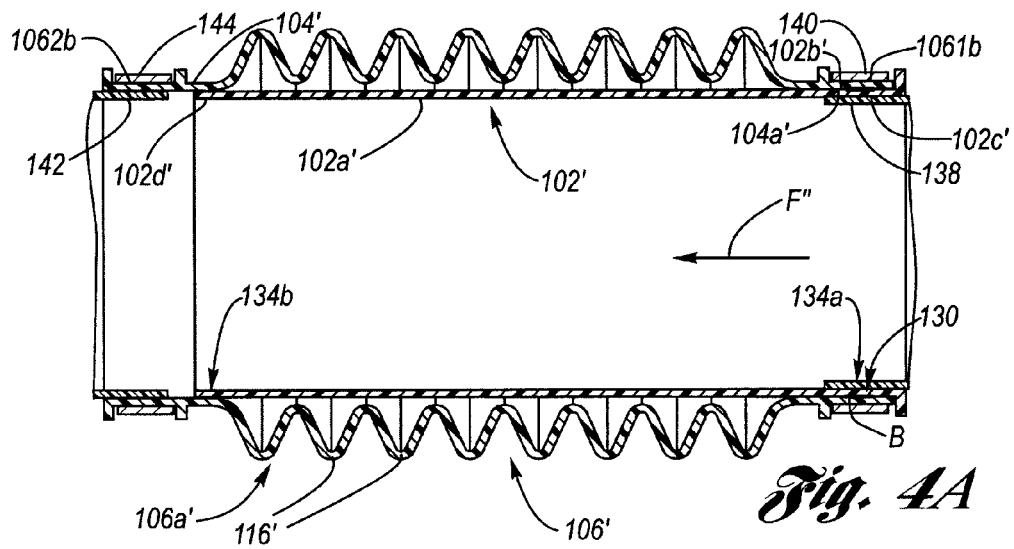
FIG. 4A is a sectional view of a straight configured convolute duct having a sleeve liner according to the present invention, wherein the sleeve liner is attached to the convolute duct by a first attachment modality.

Referring now to the Drawing, FIGS. 2 through 5B depict various aspects and examples of a sleeve lined convolute duct according to the present invention.

As shown at FIGS. 2 and 2A, the sleeve-lined convolute duct 100 according to the present invention features a sleeve liner 102 disposed at the inner side 104a of the sidewall 104 of a convolute duct 106. An air induction system (AIS) 108 of an internal combustion engine of a motor vehicle includes, conventionally, an air cleaner with a mass air flow sensor package which is connected to a throttle body of the engine intake manifold (not shown) by an air cleaner outlet duct assembly 110 which includes the sleeve lined convolute duct 100.

The sleeve liner 102 has a smooth, continuously even inner surface 102a between its attached and free ends 102c, 102d which provides a laminar air flow F' therethrough, whereby the air flow avoids any interaction with the ridges 112 and cavities 114 of the convolutes 116 of the convolute portion 106a of the convolute duct 106, yet further provides duct flexibility due to the fact that the sleeve liner is attached to the convolute duct at only one end, the attached end 102c, whereby the other, free end 102d, is able to axially slide within the convolute duct. Thus, it will be understood that the sleeve liner 102 provides consistent, laminar airflow with little pressure loss therealong, and at the same time, the sleeve liner is attached at only one end thereof so as to be slidable in relation to the convolute duct and thereby maintain the ability of the convolute duct to flex responsively to engine motion, such as compression, extension, twist, misalignment, etc., which flexibility of the convolute duct is further enhanced if the sleeve liner is, itself, flexible.

The sleeve liner 102 is preferably composed of a soft (i.e., flexible) material, as for example rubber, a thermoplastic elastomer (TPE), etc., or composed of a rigid or semi-rigid material, as for example plastic or polypropelene, etc. The sleeve liner 102 has a tube configuration, and, for example, is made by an injection molding process, blow molding, extrusion molding or any other suitable process.

The sleeve liner 102 is disposed coaxially, and at least coterminally (that is, at least as long as) the convolute portion 106a of the convolute duct 106, wherein the outer surface 102b of the sleeve liner abuts the inner side 104a of the sidewall of the convolute duct at the non-convolute portions 106b thereof, and is adjacent the innermost diameter 1161D of the convolutes 116. Preferably, the sleeve liner extends beyond both ends of the convolute portion such that the sleeve liner abuts the first and second non-convolute portions even when the convolute duct is expanded in operation.

The sleeve liner 102 is permanently disposed inside of the convolute duct 106 by attachment at an attached end 102c of the sleeve liner to a non-convolute portion of the convolute duct, while the other, free end 102d is able to slide freely within the convolute duct. Preferably, the attached end is that end which is upstream of the air flow.

While other possibilities exist to attach the attached end 102c of the sleeve liner to a non-convolute portion of the convolute duct, such as for example by clamping, the two most preferred attachment modalities 130, 132 are shown, respectively, at FIGS. 4A through 4C and FIGS. 5A and 5B.

Referring to FIG. 4A, the convolute duct 106' has a sidewall 104' which includes a convolute portion 106a' and first and second non-convolute portions 1061b, 1062b disposed at either side of the convolute portion, respectively. The configuration of the convolutes 116' in terms of size and number is predetermined per the application of the convolute duct 106' for suitable control over NVH.

The sleeve liner 102' provides the convolute duct 106' with a smooth, continuously even inner surface 102a' between the attached and free ends 102c', 102d' thereof having, by way of preferred example, a constant inner diameter, spanning the convolute portion 106a', whereby the sleeve liner effectively reduces the pressure loss which would be otherwise caused by convolute wall friction and at the same time minimizes or avoids air flow separation, turbulence and swirl.

The convolute duct 106' is made according to known processes, and the sleeve liner 102' is made by any suitable process, as for example by an injection molding process, blow molding, extrusion molding of a preferably soft (i.e., flexible) material, as for example rubber, a thermoplastic elastomer (TPE), etc., or a rigid or semi-rigid material, as for example plastic, polypropelene, etc. A mandrel (not shown) axially aligns the sleeve liner disposed within the convolute duct for attachment thereto by a chosen attachment modality.

Figure 4B:
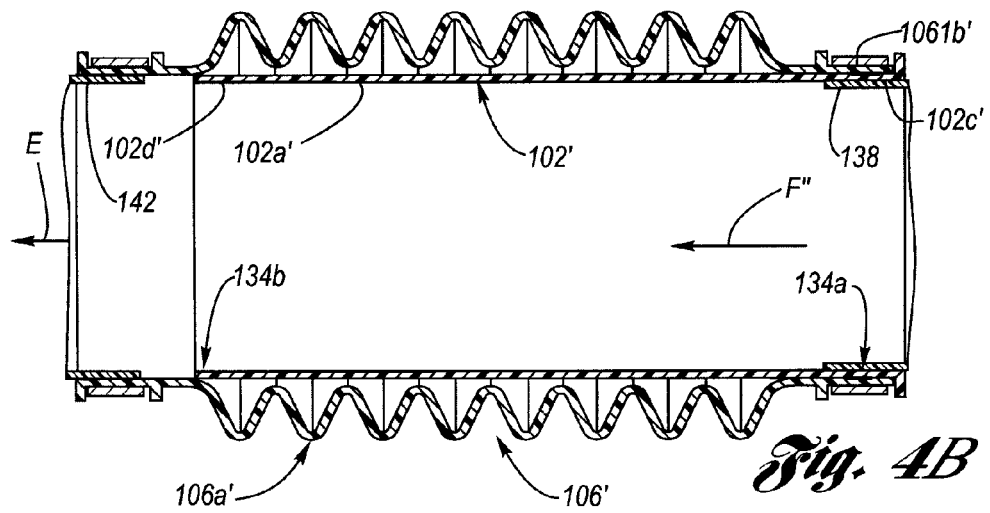
FIG. 4B is a sectional view as in FIG. 4A, wherein now the convolute duct has undergone an expansion along arrow E.
Figure 4C:
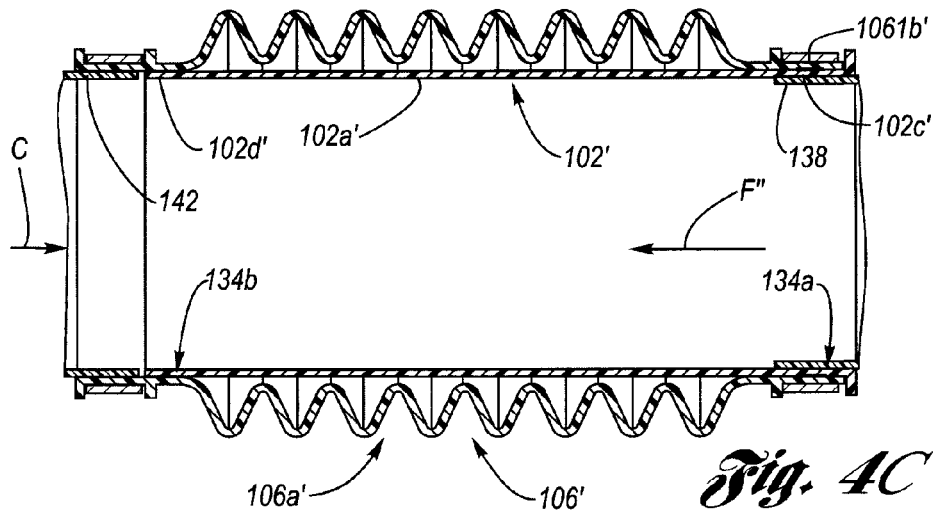
FIG. 4C is a sectional view as in FIG. 4A, wherein now the convolute duct has undergone a contraction along arrow C.

In FIGS. 4A through 4C, a first attachment modality 130 is utilized to attach the attached end 102c' of the sleeve liner 102' to the convolute duct 106' at the first non-convolute portion 1061b' thereof. The convolute duct and sleeve liner, via the mandrel, are placed into a welding fixture (not shown), whereupon a hotplate welding process ensues at the attached end 102c' of the sleeve liner to thereby create a bond B between the attached end of the sleeve liner and the inner side 104a' of the sidewall 104' of the convolute duct at the first non-convolute portion 1061b thereof that abuts the outer surface 102b' of the attached end of the sleeve liner. Now the attached end 102c' and the opposite free end 102d' of sleeve liner each form a sealing cuff 134a, 134b with respect to each of the first and second non-convolute portions 1061b', 1062b' of the convolute duct 106'. As an alternative to hot-plate welding, an adhesive may be used to bond the attached end of the sleeve liner to the first non-convolute portion of the convolute duct.

A first fitting 138 is received at the attached end 102c' of the sleeve liner 102', and an annular clamp 140 sealingly tightens the first non-convolute portion 1061b onto the attached end of the sleeve liner and the first fitting. The clamp 140 provides clamping which may serve as a substitute attachment modality in place of the bonding B. The second non-convolute portion 1062b of the convolute duct 106 receives a second fitting 142, whereby a second annular clamp 144 sealingly tightens the second non-convolute portion onto the second fitting, not affecting the slidability of the free end 102d' of the sleeve liner 102'. The first fitting 138 may, for example, be associated with a mass air sensor from the AIS, and the second fitting 142 may be, for example, associated with a throttle body, whereupon air flow is directed along arrow F".

Because the sleeve liner 102' has a free end 102d' which freely slides in relation to the convolute duct 106' as the convolute duct moves, it can maintain the ability of convolute duct to flex or twist in response to engine motion and vibration, which ability is improved if the sleeve liner is, itself, flexible. For a first example, FIG. 4B exemplifies a situation in which the second fitting 142 expansively moves away from the first fitting 138, the expansion being directed along arrow E. It will be seen the sealing cuff 134b is maintained even though the free end 102*d'* of the sleeve liner 102' slid in relation to the second non-convolute portion 106*2b* of the convolute duct 106'. For a second example, FIG. 4C exemplifies a situation in which the second fitting 142 contractively moves toward the first fitting 138, the contraction being directed along arrow C. It will be seen the sealing cuff 134*b* is maintained even though the free end 102*d'* of the sleeve liner 102' slid in relation to the second non-convolute portion 106*2b* of the convolute duct 106'.

Figure 5A:
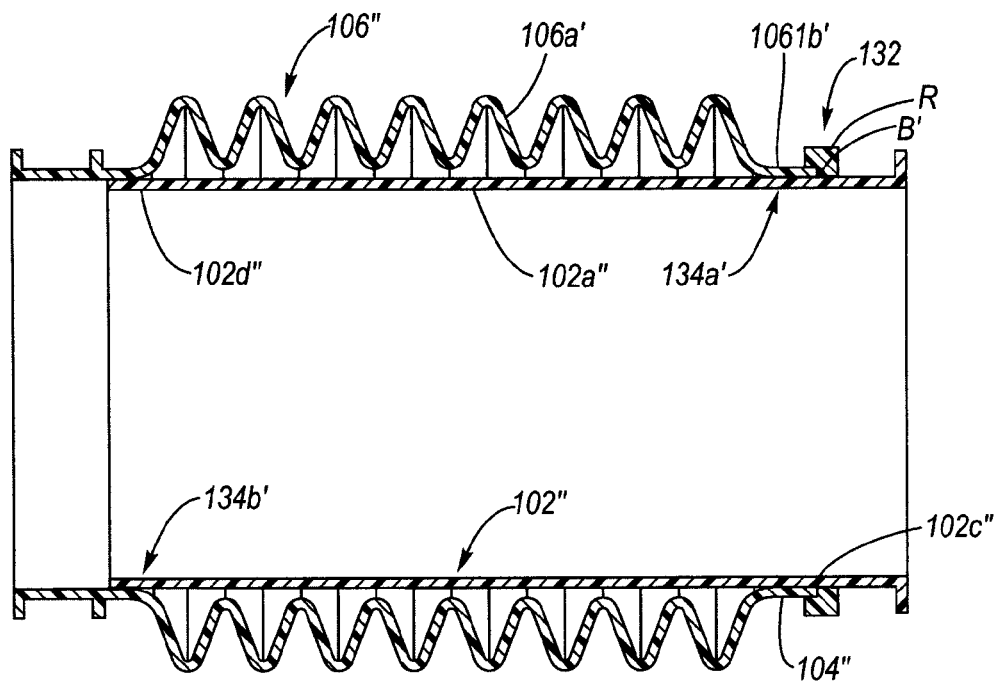
FIG. 5A is a sectional view of a straight configured convolute duct having a sleeve liner according to the present invention, wherein the sleeve liner is attached to the convolute duct by a second attachment modality.

FIG. 5A depicts the same configurational aspects as FIG. 4A, wherein like parts are indicated by like alpha-numeric designations with an extra prime, except now a second attachment modality 132 is utilized to attach the attached end 102*c"* of the sleeve liner 102" to the convolute duct 106" at the first non-convolute portion 106*b*1' thereof. The convolute duct and sleeve liner, via the mandrel, are placed into a ring mold (not shown), whereupon molten TPE, rubber, or similarly suitable material is over-molded to form a ring R which provides a bond B' with respect to the attached end 102*c"* of the sleeve liner and the sidewall 104" of the convolute duct.

Figure 5B:
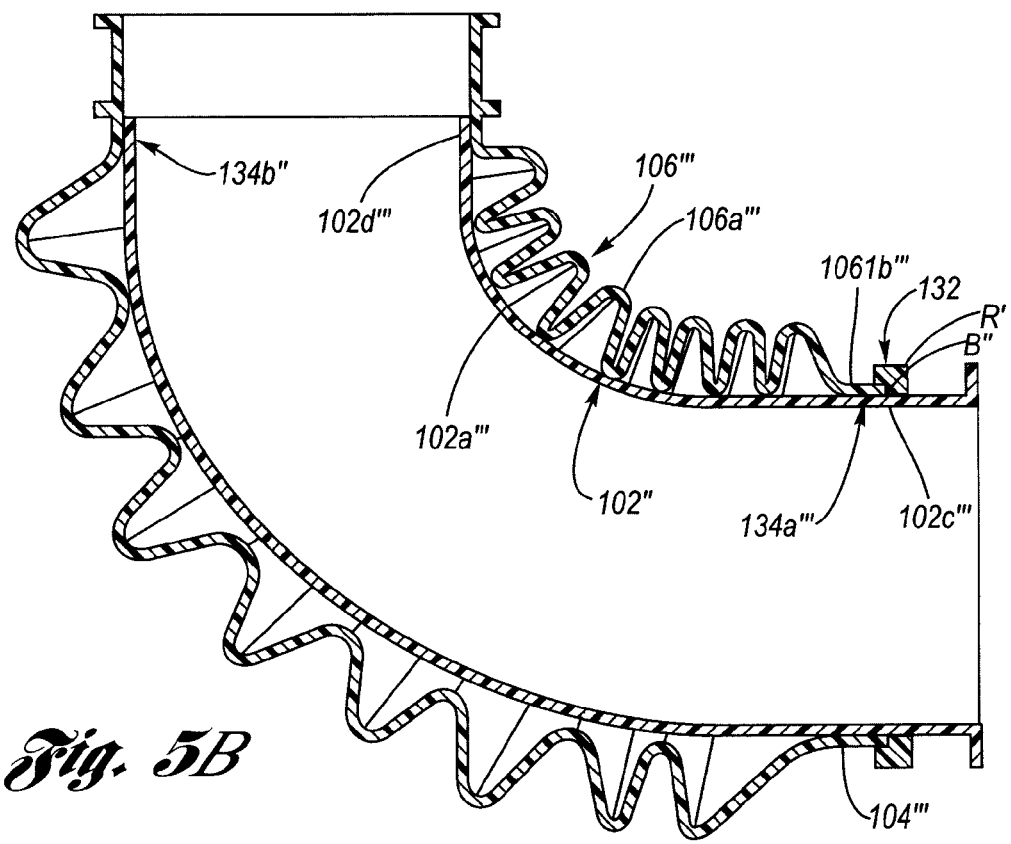
FIG. 5B is a sectional view of an elbow configured convolute duct having a sleeve liner according to the present invention, wherein the sleeve liner is attached to the convolute duct by the second attachment modality.

FIG. 5B depicts a configuration similar to FIG. 5A, including merely by way of example the second attachment modality 132, wherein like parts are indicated by like alpha-numeric designators with an extra prime, except now the convolute duct 106'" and the sleeve liner 102'" are configured as an elbow. It is to be understood that any shape configuration can be utilized in practicing the present invention.

CFD simulations have been used to analyze the effects of the sleeve liner in an air induction system, and will be next discussed.

It is known that air flow is categorized as either laminar (smooth flowing) or turbulent (rough or chaotic flowing). Laminar flow takes less energy to move the air, meaning less pressure loss. The convoluted duct has internal circumference ridges which cause turbulent flow and pressure loss due to rough surface (as discussed hereinabove with respect to FIG. 1B).

FIG. 3 depicts the air flow for an air induction system at the sleeve liner of a sleeve lined convolute duct according to the present invention. Results show that the introduction of a sleeve liner in the convolute duct not only reduces the pressure loss but also regulates the downstream air flow. The CFD simulations show the pressure loss of air induction system is reduced by 6 percent at 200 g/s specifically because of the sleeve liner. The sleeve liner can improve airflow movement and reduce the pressure loss. The sleeve liner provides very little friction resistance and does not disrupt the air flow.

Without a sleeve liner, convolutes create turbulence and restrict air flow, as shown at FIG. 1B, wherein the turbulent layer has random velocity vectors and some velocity vectors in the turbulent layer are rubbing against, or opposing, the incoming airflow. Furthermore, airflow trapped in the convolute keeps swirling and dissipates flow energy. The swirling flow interferes with mainstream flow and impedes moving the flow. Therefore, it takes more energy to move airflow in the convoluted duct. This kind of extra energy is translated into pressure loss.

In contrast according to the present invention, the sleeve liner reduces pressure loss caused by the internal friction of airflow in the convoluted duct. The sleeve liner serves to minimize the internal surface roughness. There is no waste of energy on air flow swirling. As shown in FIG. 3, all flow velocity vectors F' are pointing in the same direction. With the sleeve liner, the flow consists of many laminar streams. There is no obvious flow interference. In turn, the flow friction pressure loss is lessened.

Actual air flow testing further confirmed the benefits of the sleeve liner. A hand-made sleeve liner was mounted inside a convoluted duct of a production air induction system. The pressure loss of the air induction system with a sleeve liner in the convolute duct was about 5 percent lower than the convolute duct without sleeve liner at 200 g/s.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A sleeve lined convolute duct, comprising:
   a convolute duct comprising a convolute portion and a pair of non-convolute portions, wherein one non-convulate portion of said pair of non-convolute portions is disposed at each side of said convolute portion, respectively;
   a sleeve liner disposed within said convolute duct and spanning said convolute portion, said sleeve liner having an attached end and an opposite free end, said sleeve liner having a constant inner diameter and a smooth, continuously even inner surface, wherein said spanning is at least coterminal with said convolute portion such that said sleeve liner sealingly abuts said pair of non-convolute portions; and
   an attachment of said sleeve liner at said attached end thereof to a non-convolute portion of said convolute duct;
   wherein said free end of said sleeve liner is freely slidable in said convolute duct in response to movements of said convolute duct, wherein said free end always remains in a sealing cuff abutment with a non-convolute portion of said pair of non-convolute portions; and
   wherein said free and attached ends of said sleeve liner each form a respective sealing cuff with respect to each said non-convolute portion of said convolute duct.

2. The sleeve lined convolute duct of claim 1, wherein said convolute duct and said sleeve liner are flexible.

3. The sleeve lined convolute duct of claim 1, wherein said sleeve liner has a smooth, continuously even inner surface between said attached and free ends thereof.

4. The sleeve lined convolute duct of claim 3, wherein said convolute duct and said sleeve liner are flexible.

5. The sleeve lined convolute duct of claim 3, wherein said attachment comprises bonding.

6. The sleeve lined convolute duct of claim 5, wherein said convolute duct and said sleeve liner are flexible.

7. The sleeve lined convolute duct of claim 5, wherein said bonding comprises a weld.

8. The sleeve lined convolute duct of claim 7, wherein said convolute duct and said sleeve liner are flexible.

9. The sleeve lined convolute duct of claim 5, wherein said bonding comprises over-molding.

10. The sleeve lined convolute duct of claim 9, wherein said convolute duct and said sleeve liner are flexible.

11. The sleeve lined convolute duct of claim 3, wherein said attachment comprises clamping.

12. The sleeve lined convolute duct of claim 11, wherein said convolute duct and said sleeve liner are flexible.

13. An air induction system, comprising:
   an air cleaner; and
   an air cleaner outlet duct assembly connected to said air cleaner, said outlet duct assembly comprising:
   a convolute duct comprising a convolute portion and a pair of non-convolute portions, wherein one non-convulate portion of said pair of non-convolute portions is disposed at each side of said convolute portion, respectively;

a sleeve liner disposed within said convolute duct and spanning said convolute portion, said sleeve liner having an attached end and an opposite free end, said sleeve liner having a constant inner diameter and a smooth, continuously even inner surface, wherein said spanning is at least coterminal with said convolute portion such that said sleeve liner sealingly abuts said pair of non-convolute portions; and an attachment of said sleeve liner at said attached end thereof to a non-convolute portion of said convolute duct;

wherein said free end of said sleeve liner is freely slidable in said convolute duct in response to movements of said convolute duct, wherein said free end always remains in a sealing cuff abutment with a non-convolute portion of said pair of non-convolute portions; and wherein said free and attached ends of said sleeve liner each form a respective sealing cuff with respect to each said non-convolute portion of said convolute duct.

14. The air induction system of claim 13, wherein said sleeve liner has a smooth, continuously even inner surface between said attached and free ends thereof.

15. The air induction system of claim 14, wherein said convolute duct and said sleeve liner are flexible.

16. The air induction system of claim 14, further comprising:

a first fitting of said air cleaner sealingly received by said attached end of said sleeve liner; and a second fitting sealingly received by the non-convolute portion of said convolute duct whereat said free end of said sleeve liner forms a said sealing cuff respectively therewith.

17. The air induction system of claim 16, wherein said convolute duct and said sleeve liner are flexible.

* * * * *